(12) United States Patent
Henderson

(10) Patent No.: US 8,678,177 B2
(45) Date of Patent: Mar. 25, 2014

(54) COMBINATION SLIDER BLOCK AND PUSHER LUG

(75) Inventor: Deane R. Henderson, Salmon Arm (CA)

(73) Assignee: Northern Plastics Ltd., Salmon Arm (CA)

( * ) Notice: Subject to any disclaimer, the term of this patent is extended or adjusted under 35 U.S.C. 154(b) by 8 days.

(21) Appl. No.: 13/542,410

(22) Filed: Jul. 5, 2012

(65) Prior Publication Data

US 2014/0008185 A1    Jan. 9, 2014

(51) Int. Cl.
*B65G 19/24* (2006.01)
*B65G 19/26* (2006.01)
*B65G 19/00* (2006.01)
*B65G 17/38* (2006.01)

(52) U.S. Cl.
CPC ............... *B65G 19/00* (2013.01); *B65G 17/38* (2013.01)
USPC .................... 198/731; 198/732; 198/699.1

(58) Field of Classification Search
USPC ........................ 198/717–733, 699.1
See application file for complete search history.

(56) References Cited

U.S. PATENT DOCUMENTS

| 4,441,605 | A | * | 4/1984 | Ronco et al. ................. 198/731 |
| 4,518,077 | A | * | 5/1985 | Ronco et al. ................. 198/731 |
| 5,165,523 | A | * | 11/1992 | Wooley et al. ............... 198/731 |
| 5,501,318 | A | * | 3/1996 | Disrud .......................... 198/732 |
| 5,806,659 | A | * | 9/1998 | Middelberg et al. ......... 198/731 |
| 5,911,303 | A | * | 6/1999 | Malanowski ................. 198/731 |
| 6,964,334 | B2 | | 11/2005 | Henderson et al. |
| 7,530,448 | B2 | * | 5/2009 | Henderson et al. ........ 198/699.1 |

* cited by examiner

*Primary Examiner* — James R Bidwell
(74) *Attorney, Agent, or Firm* — Antony C. Edwards

(57) ABSTRACT

A combination slider block and pusher lug for mounting on a base plate mounted on a transfer chain includes a flanged channel having a latch and a base plate receiving cavity for snugly fitting over the base plate. A pair of flanges extend inwardly in opposed facing relation over the cavity from the sides of the channel so as to define a slot sized to receive the mount such as the weld between the base plate and the chain. The web of the flanged channel has a lug mounted orthogonally thereto. The cavity has an opening at one end, sized to receive the base plate therethrough. An opposite end of the cavity includes a stop to arrest sliding translation of the base plate through and along the cavity. The latch is mounted adjacent the opening. The latch operates to selectively lock the base plate in the cavity.

17 Claims, 5 Drawing Sheets

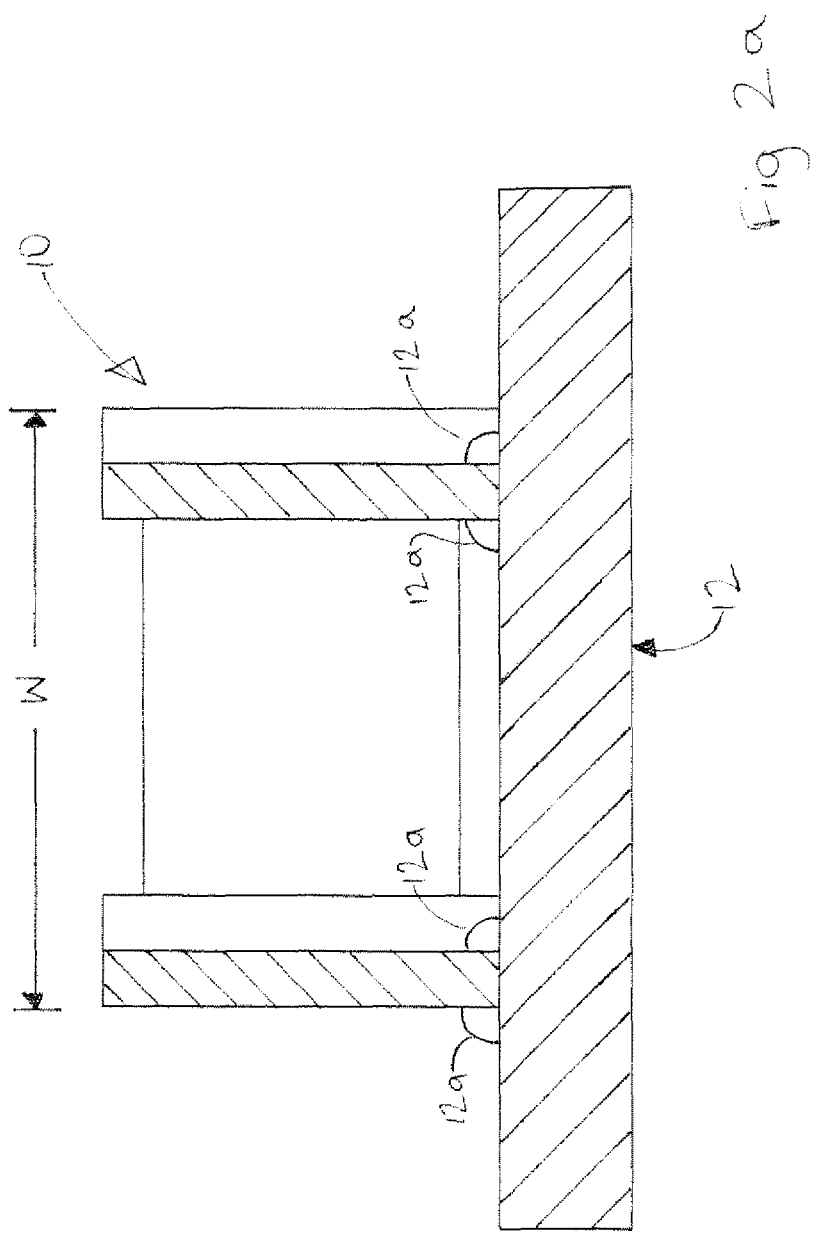

COMBINATION SLIDER BLOCK AND PUSHER LUG

FIELD OF THE INVENTION

This invention relates to the field of pusher lug lumber conveyors employed in the lumber industry, and in particular to an improvement to pusher lugs and slider blocks.

BACKGROUND OF THE INVENTION

As stated by Henderson et al in U.S. Pat. No. 6,964,334 which issued Nov. 15, 2005, it is common practice in lumber processing facilities such as sawmills to transport lumber over the top of sorter bins by overhead chain conveyors equipped with pusher lugs. Chain conveyors for the movement of lumber have links which each have an upstanding lug mounted thereon, spaced at intervals along the chain. Movement of the chain brings the lug into contact with the lumber, which is then urged in the direction of the running of the chain. When the lumber is located over a desired bin, a gate corresponding to that bin opens allowing the lumber to fall into that bin. Conventionally, a slider block is rigidly mounted to the chain where the pusher lugs attach to the chain to facilitate sliding translation of the lugs along the conveyor. Typically, fasteners attach the slider block to the chain, requiring that the chain links be pre-drilled where the slider blocks are to be fastened. Thus, the process of attaching the slider blocks to the chain is time consuming and costly.

Consequently Henderson et al disclosed a slider block that required no pre-drilling of the chain and no fasteners for mounting of the slider block onto the chain and pusher lug. The snap-on slider block provided for efficient installation and replacement of slider blocks. Henderson et al described the slider block as a length of resilient flanged channel having a cut-out in the lower web of the channel to accommodate mounting a flat bar journalled in the cut-out. The flanged channel had a length sufficient to cover the length of a base plate on which the flat bar was orthogonally mounted. The sides of the channel defined a cavity having a depth corresponding to the thickness of the base plate. A pair of flanges extended inwardly over the cavity from the sides of the channel so as to define a chain-receiving slot therebetween. The base plate mounted within the cavity. The base plate was welded to a chain so that when the base plate was mounted in the cavity the chain was mounted in and along the chain-receiving slot.

In the prior art applicant is also aware of U.S. Pat. No. 7,530,448 which issued May 12, 2009, to Henderson et al for Capped Lugs for Transfer Chains. Henderson et al describe each lug as having a cap defining a housing in which the lug is mounted, and wherein the housing is sealed around the lug to inhibit the entry of detritus into the housing.

A drawback of the snap-on slider block of U.S. Pat. No. 6,964,334 is that the lug is metal and rigidly mounted to the chain. Thus, in the event of jamming or collisions of boards on the chain conveyor causing damage to the lugs, especially if the lugs are older and fatigued, the metal lugs will bend making them unusable. Metal lugs which have been bent or otherwise deformed so that they are no longer useful must be cut off and replaced. This typically requires that initially the lug is cut off to leave a stub so that a snap-on slider block may still be mounted on the base plate and the conveyor can then be later repaired properly to replace the stub with a full size metal lug. The cutting off of the damaged lug requires, at least to the extent that applicant's are aware, a hot work permit for the use of the torch within the mill facility and so it is inconvenient to effect the repair.

It is preferable that, in the event of damage, that the lugs break off rather than deform and have to be cut off. Consequently the present invention provides a combination slider block and lug which snaps into place over the base plate welded to the transfer chain either in the case of new chains where all the slider blocks and lugs are of the snap-on design according to the present invention, or in the case where a lug is damaged, once the damaged lug has been entirely removed. In either case the snap-on combination slider blocks and pusher lug is intended to snap off, rather than bend or deform, in the event of a damage-causing event.

SUMMARY OF THE INVENTION

In summary the combination slider block and pusher lug according to the present invention for mounting on a base plate mounted on a transfer chain, wherein the base plate has a length, a width and a thickness, and is mounted substantially flush on the chain, and wherein a mount mounts the base plate to the chain, and wherein the mount is inset from the sides of the base plate, may be characterized in one aspect as including a flanged channel having a latch and a base plate receiving cavity wherein opposite sides of the channel define the cavity. The cavity has a depth corresponding to the thickness of the base plate, and a width corresponding to the width of the width base plate. In particular, the width includes the sides of the base plate. A pair of flanges extend inwardly in opposed facing relation over the cavity from the sides of the channel so as to define a slot therebetween. The slot is sized to receive therein the mount between the base plate and the chain, so that when the base plate is mounted within the cavity, the mount mates in and along the slot.

The flanged channel has a web between the sides which covers substantially the length and the sides of the base plate when the base plate is mounted in the cavity. The web has a lug mounted orthogonally thereto so as to protrude orthogonally from the web. Thus the lug is disposed on the web orthogonally to the cavity. The cavity has an opening therein at one end of the flanged channel, sized to receive therethrough the base plate. An opposite end of the cavity, opposite to the opening, includes a stop to arrest sliding translation of the base plate through and along the cavity. In operation of the transfer chain, as the lug translates and engages a board the stop is urged against the base plate.

The latch selectively locks the base plate in the cavity and is mounted to the flanged channel so as to be adjacent the opening. The latch may be biased between an open position wherein the opening is unobstructed for receiving the base plate therethrough, and a closed position selectively locking the base plate into the cavity.

The latch may advantageously be resilient and may include a tongue mounted to the flanged channel, and wherein a distal end of the tongue has a latch dog which at least partly occludes the opening when the latch is in the closed position. In one embodiment not intended to be limiting the tongue is mounted to the web along a resilient hinge-line so as to provide a resilient hinge for resilient biasing of the latch between the open and closed positions. In further embodiments the tongue is formed as part of the flanged channel, and the entire flanged channel is resiliently deformable.

In one embodiment the flanged channel has at least one cut-out and each cut-out contains at least part of a corresponding tongue so that the hinge line is recessed within the each cut-out. In some embodiments each cut-out contains substantially all of its corresponding tongue. Advantageously at least one cut-out is in the web.

In one embodiment the opposed-facing flanges define a corresponding height of the cavity, where the height is the distance between each of the opposed-facing flanges and the web, and wherein the latch dog has a height which is less than the height of the cavity. Thus the deflection distance is minimized for the tongue to deflect into its latch open position.

In the illustrated embodiment, which is not intended to be limiting, the latch dog is a lip extending across the tongue. The lip may have a notch for the insertion of a tool between the tongue and the plate. The tool, which may be a bladed tool such as a screw driver, may thus deflect the tongue into the latch open position.

In a preferred embodiment, in the latch closed position the web and the tongue are substantially planar, the tongue is cantilevered from the web, and the tongue and the web are substantially co-planar when the tongue is undeflected.

In embodiments wherein the web has a cut-out and wherein the cut-out contains at least part of or all of the tongue so that the hinge line is recessed within the cut-out, the tongue may be deflected so as to operate the latch while the base plate is fully supported within the cavity to thereby maintain the mounting of the flanged channel on the base plate as the tongue is levered into its open position.

BRIEF DESCRIPTION OF THE DRAWINGS

FIG. 2a is a sectional view along line 2a-2a in FIG. 2.

DETAILED DESCRIPTION OF EMBODIMENTS OF THE INVENTION

Figure 1:
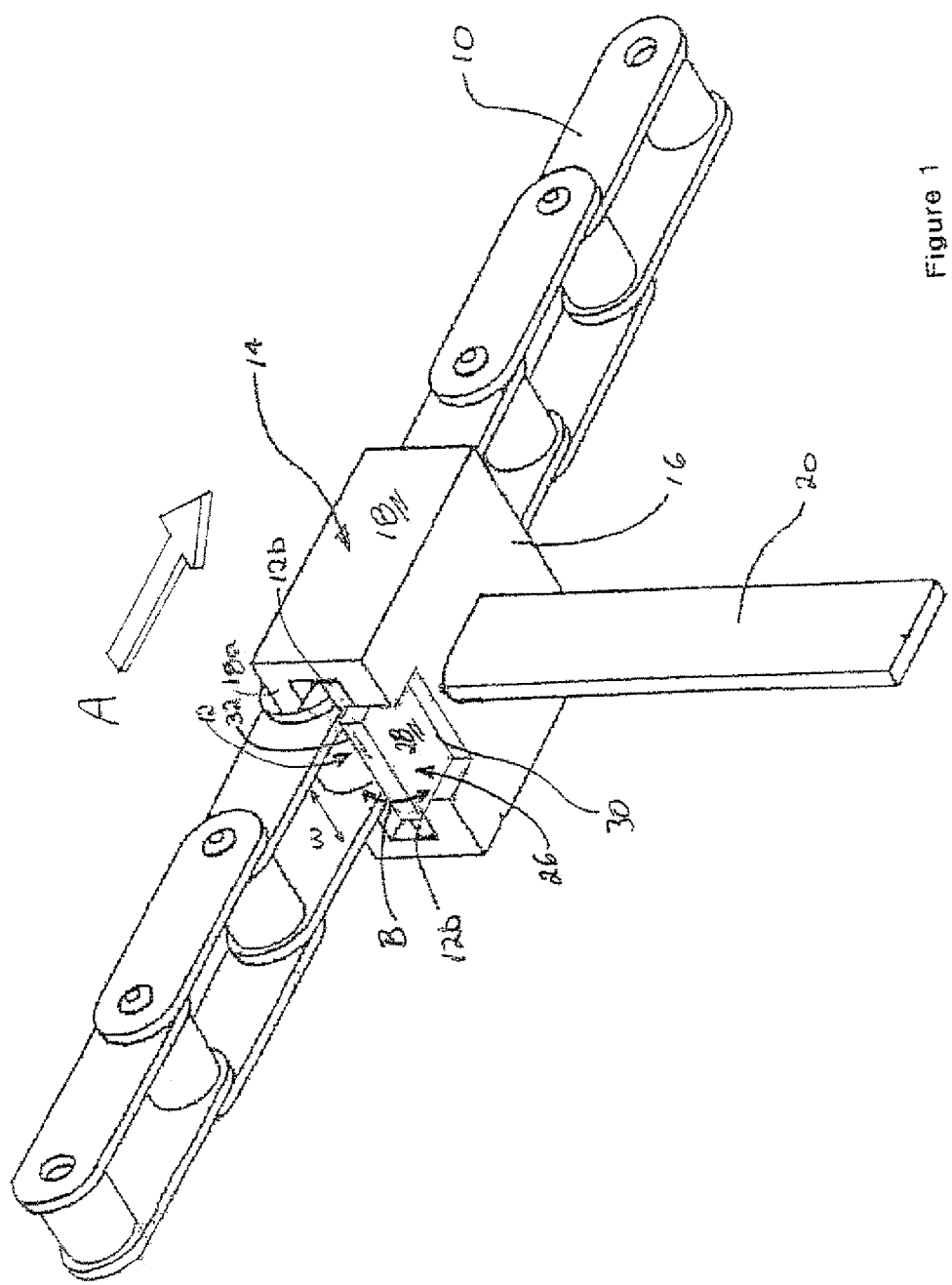
FIG. 1 is a right-side perspective view of a combination slider block and pusher lug according to one embodiment of the present invention.
Figure 2:
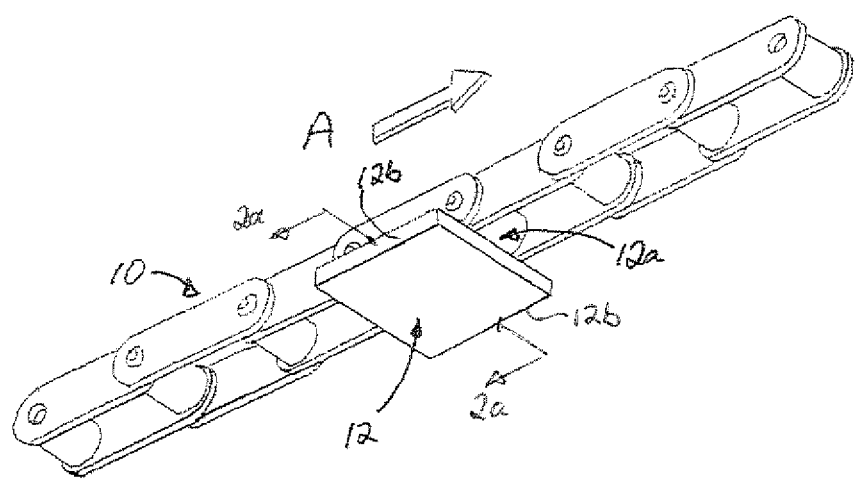
FIG. 2 is a perspective view of the chain and base plate of FIG. 1.

With reference to the drawing figures wherein similar characters of reference denote corresponding parts in each view, as seen for example in FIGS. 1, 2 and 2a, a length of chain 10 has base plate 12 welded to it at a weld or mount 12a between the base plate and chain, across the width "w" of chain 10.

Figure 3:
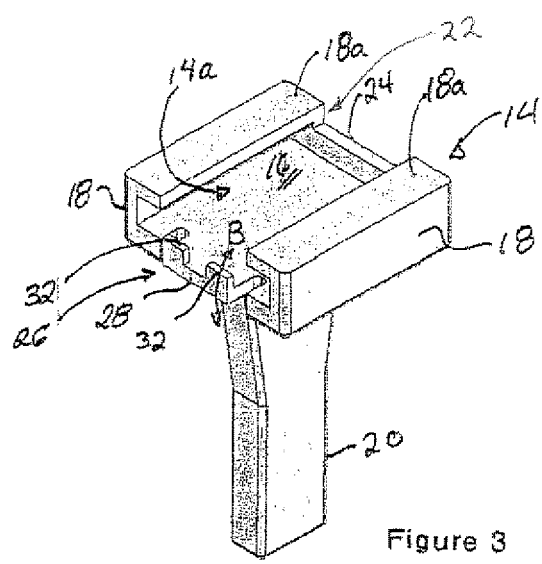
FIG. 3 is top perspective view of a further embodiment of the pusher lug of FIG. 1.
Figure 4:
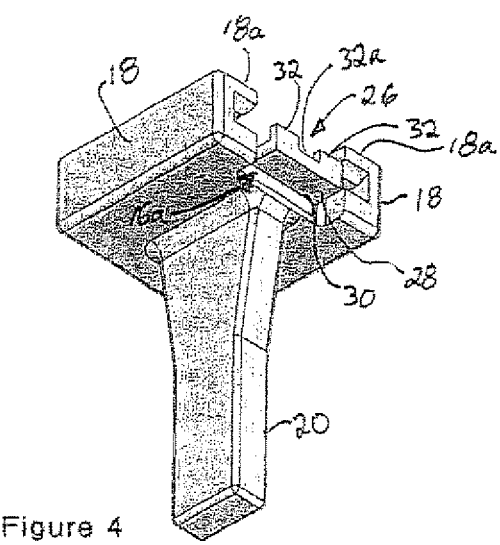
FIG. 4 is a bottom perspective view of the pusher lug of FIG. 3.
Figure 5A:
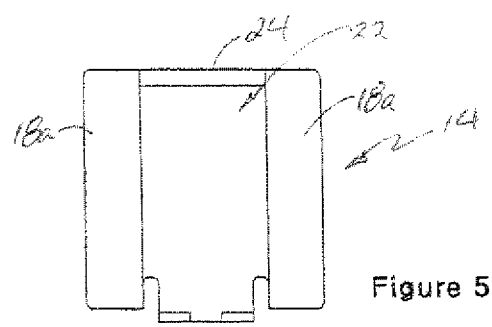
FIG. 5a is, in plan view, the pusher lug of FIG. 3.
Figure 5B:
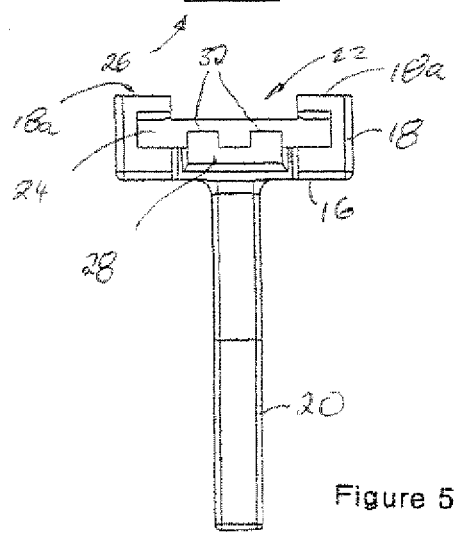
FIG. 5b is, in front elevation view, the pusher lug of FIG. 3.
Figure 5C:
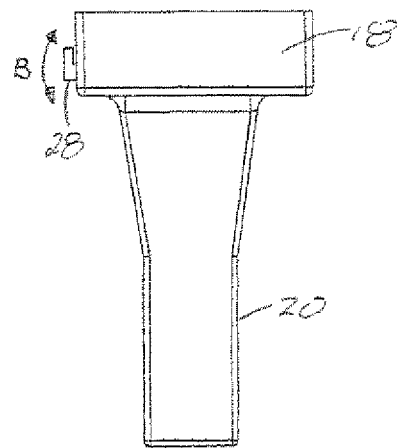
FIG. 5c is, in right side elevation view, the pusher lug of FIG. 3.

Slider block 14 may advantageously be made of wear-resistant resilient material such as plastic or other malleable or formable solids. In preferred embodiments, such as seen in FIGS. 1 and 3, block 14 is a flanged channel, sleeve or envelope (collectively referred to as a flanged channel) so that block 14 slides snugly over plate 12, except for where plate 12 is welded at mount 12a to chain 10, so that the plate is snuggly journalled in the cavity 14a defined by the interior of the flanged channel. The web 16 joining side walls 18 of slider block 14 has a pusher lug 20 mounted orthogonally to it. It is understood that a plurality of a combination of slider blocks and pusher lugs are mounted in spaced array along the length of the chain. Only one of the combination slider blocks and pusher lugs is illustrated.

Opposed facing inwardly turned flanges 18a mounted along the upper edges of side walls 18 define a slot 22 between flanges 18a for receiving weld or mount 12a therein as slider block 14 is slid over base plate 12 until base plate 12 abuts end wall or stop 24.

In operation, chain 10, plates 12 and slider blocks 14 run along the inner lowermost surfaces inside a chain run (not shown). Thus, the lower surface of slider block 14 may be contoured to match the contour of the inner lowermost surface of the chain run. Lug 20 protrudes downwardly from slider block 14 and through a slot in the lowermost surfaces of the chain run. As chain 10 is run in direction A along its longitudinal axis, slider block 14 slides along the inner surface of the chain run, carrying lug 20. That is, chain 10 is run in a direction such that lug 20 pushes plate 12 against the end wall or stop 24. On an endless chain, at the end of the chain run, the pusher lug and slider block are returned along the corresponding chain return which may be a chain return channel in which chain 10 is run. Slider block 16 carries plate 12 and lug 20 over the upper surface of the chain return channel.

A latch 26 is provided on web 16 to hold plate 12 within the cavity 14a defined by the flanged channel so as substantially abut plate 12 against end wall or stop 24. In an alternative embodiment, not illustrated, one or more latches 26 may be provided, which may for example be mounted on one or both of side walls 18, whether or not in addition to a latch 26 being mounted on web 16. Latch 26 may, as illustrated, take the form of a resilient tongue 28, although this is not intended to be limiting. Tongue 28 may, as illustrated be recessed into a cutout 16a in web 16. Thus tongue 28 may be substantially contained within cut-out 16a while being cantilevered from web 16 along hinge line 30. Thus tongue 28 may deflect resiliently in direction B about hinge line 30. In its normal non-resiliently biased position an upwardly extending hook, lip, dog or flange 32 on the distal end of tongue 28 engages against the corresponding end edge of plate 12 so as to releasably lock plate 12 into cavity 14a. Tongue 28 may be deflected downwardly when it is desired to remove slider block 14 and lug 20 from plate 12, for example if lug 20 becomes damaged during use.

A notch 32a may be provided in flange 32 so that for example a lever such as a screwdriver blade may be inserted through notch 32a and under plate 12. With the lever thus positioned, tongue 28 may be deflected downwardly by levering the lever downwardly, thereby releasing latch 26 from its engagement with plate 12, thereby allowing slider block 14 to be slid off plate 12.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A combination slider block and pusher lug for mounting on a base plate mounted on a transfer chain wherein the base plate has a length, a width and a thickness, and is mounted substantially flush on the chain, and wherein a mount mounts the base plate to the chain, and wherein the mount is inset from the sides of the base plate, the combination slider block and pusher lug comprising:

a flanged channel having a base plate receiving cavity wherein opposite sides of said channel define said cavity, said cavity having a depth corresponding to the thickness of the base plate, and a width corresponding to the width of the base plate and which includes the sides of the base plate, and wherein a pair of flanges extend inwardly in opposed facing relation over said cavity from said sides of said channel so as to define a slot therebetween and wherein said slot is sized to receive therein the mount between the base plate and the chain, so that when the base plate is mounted within said cavity, the mount mates in and along said slot, wherein said flanged channel has a web between said sides which covers substantially the length and the sides of the base plate when the base plate is mounted in the cavity and wherein said web has a lug mounted orthogonally thereto so as to protrude orthogonally from said web, disposed on said web orthogonally to said cavity, wherein said cavity has an opening therein at one end of said flanged channel, sized to receive therethrough the base plate, and wherein an opposite end of said cavity, opposite to said opening, includes a stop to arrest sliding translation of the base plate through and along said cavity, and wherein a latch is mounted to said flanged channel so as to be adjacent said opening and wherein said latch is biasable between an open position wherein said opening is unobstructed for receiving the base plate therethrough, and a closed position selectively locking the base plate into said cavity.

2. The device of claim 1 wherein said latch is resilient.

3. The device of claim 2 wherein said latch includes a tongue mounted to said flanged channel, and wherein a distal end of said tongue has a latch dog which at least partly occludes said opening when said latch is in said closed position.

4. The device of claim 3 wherein said tongue is mounted to said web along a resilient hinge-line so as to provide a resilient hinge for resilient biasing of said latch between said open and closed positions.

5. The device of claim 4 wherein said flanged channel is resiliently deformable.

6. The device of claim 1 wherein said flanged channel is resiliently deformable.

7. The device of claim 4 wherein said flanged channel has at least one cut-out and wherein each cut-out of said at least one cut-out contains at least part of a corresponding said tongue so that said hinge line is recessed within at least one said each cut-out.

8. The device of claim 7 wherein said each cut-out contains substantially all of said tongue.

9. The device of claim 7 wherein said at least one cut-out is in said web.

10. The device of claim 3 wherein said opposed-facing flanges define a corresponding height of said cavity between each of said opposed-facing flanges and said web, and wherein said latch dog has a height which is less than said height of said cavity, whereby a deflection distance of said tongue when deflected into said latch open position is minimized.

11. The device of claim 10 wherein said latch dog is a lip extending across said tongue.

12. The device of claim 11 wherein said lip has a notch for the insertion of a tool between said tongue and said plate, whereby the tool deflects said tongue into said latch open position.

13. The device of claim 4 wherein said web and said tongue are substantially planar, and wherein said tongue is cantilevered from said web.

14. The device of claim 13 wherein said tongue and said web are substantially co-planar when said tongue is undeflected.

15. The device of claim 14 wherein said web has a cut-out and wherein said cut-out contains at least part of said tongue so that said hinge line is recessed within said cut-out.

16. The device of claim 15 wherein said cut-out contains substantially all of said tongue.

17. The device of claim 16 wherein said flanged channel is resiliently deformable.

\* \* \* \* \*